United States Patent [19]

Edwards

[11] Patent Number: 5,073,587

[45] Date of Patent: Dec. 17, 1991

[54] POLYMERIC COMPOSITION AND METHOD OF PRODUCING SAME

[76] Inventor: Bill R. Edwards, 10311 Merton St., Wichita, Kans. 67209

[21] Appl. No.: 464,945

[22] Filed: Jan. 16, 1990

[51] Int. Cl.⁵ .............................................. C08K 5/42
[52] U.S. Cl. .................................. 524/166; 524/236; 524/392; 524/496; 524/437; 524/556; 524/560; 526/332; 526/314; 526/224
[58] Field of Search ................ 524/556, 560, 392, 166

[56] References Cited

U.S. PATENT DOCUMENTS

| | | | |
|---|---|---|---|
| Re. 31,165 | 3/1988 | Serini et al. .......................... | 525/67 |
| 2,445,536 | 7/1948 | Parsons .............................. | 260/77.5 |
| 2,964,501 | 12/1960 | Sarofeen ............................. | 260/77.5 |
| 3,250,813 | 5/1966 | Stephenson ......................... | 260/614 |
| 3,268,484 | 8/1966 | Costanza ............................ | 260/77.5 |
| 3,487,062 | 12/1969 | Bodycot ............................. | 260/89.5 |
| 3,847,865 | 11/1974 | Duggins ............................. | 260/42.52 |
| 3,957,921 | 5/1976 | Iwahashi ............................ | 260/901 |
| 4,113,803 | 9/1978 | Price .................................. | 260/885 |
| 4,152,506 | 5/1979 | Novak ................................ | 526/224 |
| 4,159,301 | 6/1979 | Buser et al. ........................ | 264/331 |
| 4,210,565 | 7/1980 | Emmons ............................. | 524/560 |
| 4,214,064 | 7/1980 | Kanazawa .......................... | 526/193 |
| 4,260,564 | 4/1981 | Baiocchi ............................. | 264/2.2 |
| 4,319,003 | 3/1982 | Gardlund ........................... | 525/148 |
| 4,413,089 | 11/1983 | Gavin et al. ........................ | 524/785 |
| 4,528,351 | 7/1985 | Tarumi et al. ..................... | 526/314 |
| 4,588,798 | 5/1986 | Heitner .............................. | 526/228 |
| 4,743,654 | 5/1988 | Kyu et al. ........................... | 525/148 |
| 4,745,029 | 5/1988 | Kambour ........................... | 428/412 |
| 4,791,184 | 12/1988 | Nagai et al. ........................ | 526/329.7 |
| 4,945,122 | 7/1990 | Edwards ............................ | 524/166 |

*Primary Examiner*—Joseph L. Schofer
*Assistant Examiner*—Mark D. Sweet
*Attorney, Agent, or Firm*—Bill D. McCarthy; Glen M. Burdick

[57] ABSTRACT

An acrylic-based particulate filled polymeric composition is provided which is curable at atmospheric pressure and ambient temperature and has a pour to pull time of less than about 4 hours. The acrylic-based particulate filled polymeric composition comprises an intimate blend of a polymerization syrup, a filler, and minor effective amount of crosslinking agent, a polymerization catalyst, a quaternary compound and a polymerization initiator. To enhance and reduce the pour to pull time of articles molded or cast from the acrylic-based particular filled polymeric composition, an effective miner amount of a reaction modifier, such as trimethylpropane triacrylate, can be incorporated into the polymeric composition. The polymerization syrup employed in formulating an acrylic-based particulate filled polymeric composition consist essentially of from about 300 to about 1,000 parts by volume of an acrylic monomer, from about 0.01 to about 1 part by volume of peroxide-free oxygen donator, from about 0.5 to about 5 parts by volume of a mercaptan, and from about 0.3 to about 40 parts by volume of a crosslinking agent compatible with the acrylic monomer.

20 Claims, No Drawings

POLYMERIC COMPOSITION AND METHOD OF PRODUCING SAME

BACKGROUND OF THE INVENTION

1. Field of the Invention

The present invention relates generally to acrylic resin compositions, and more particularly, but not by way of limitation, to acrylic-based polymeric compositions filled with particulate material and having a granite-like appearance.

2. Brief Description of the Prior Art

Polished slabs of natural granite have heretofore been used as construction materials because of the decorative appearance and durability of natural granite. However, natural granite is dense and thus, very heavy. Further, natural granite is not only brittle, but is also very expensive.

The prior art is replete with filled polymeric compositions purported to be useful as a replacement for natural granite in construction applications, such as wains coating, floor tiles, bathroom vanity tops, kitchen countertops, window sills, and the like. For example, Buser et al., U.S. Pat. No. 4,159,301 discloses a simulated granite which comprises:

(A) from about 35 to 95% by volume of a matrix consisting essentially of at least 34% by volume of a polymer, preferably an acrylic polymer, having a refractive index between 1.4 and 1.65, and about 1 to 50% by volume of at least 1 microscopic filler having an amorphous or mean crystalline axial refractive index between 1.4 and 1.65;

(B) about 0.1 to 50% by volume of macroscopic opaque particles having a optical density to visible light greater than 2.0; and (C) about 0.1 to 50% by volume of macroscopic translucent and/or transparent particles having an optical density to visible light less than 2.0.

The ratio of the constituents (A) to (B) to (C) employed in the formulation of the simulated granite of Buser et al. is such that the optical density to visible light of a 0.05 inch thick wafer of the composite is less than 3.0. The simulated granite is prepared by making a castable composition from the ingredients (A), (B), and (C), wherein the castable composition has a kinematic viscosity no greater than 1000 stokes and a particle settling rate slow enough that it can be controllably cast onto a smooth surface and poured into a mold and cured giving a flat or shaped article having a reproducible simulated granite pattern.

Gavin, et. al., U.S. Pat. No. 4,413,089 discloses an alumina trihydrate filled polymeric composition having a substantially uniform color and desired properties of machine ability, translucency and visual depth. The alumina trihydrate filled polymeric composition is prepared by curing a glamourizable acrylic composition containing alumina trihydrate filler and a dispersion of iron oxide pigments. The iron oxide pigments are selected according to particle size to avoid interference with the desired properties of the glamourizable acrylic composition containing the alumina trihydrate filler.

While particulate filled polymeric compositions have heretofore been developed which have improved aesthetic appearances, problems have nevertheless been encountered in the use of such prior art compositions in that the cured polymeric compositions are brittle and thus easily chipped, or the polymeric compositions and articles produced therefrom are expensive to manufacture. Thus, the need has remained for improved acrylic-based polymeric compositions filled with particulate materials which have an aesthetically pleasing appearance, such as that of natural granite. Further, such improved acrylic-based particulate filled compositions should desirably be economical to manufacture, and durable so that articles poured or molded from such polymeric compositions do not easily chip without sacrificing the desired properties of weatherability, machinability, visual depth and the like. It is to such a composition that this present invention is directed.

SUMMARY OF THE INVENTION

In accordance with the present invention an acrylic-based, particulate filled polymeric composition is provided which possesses improved properties as to weatherability, heat and solvent resistance, impact strength, and which has an aesthetically pleasing appearance similar to a polished slab of granite or similar material. Broadly, the particulate filled, acrylic-based polymeric composition (which is curable at ambient temperature and atmospheric pressure and has a substantially reduced pour to pull time) comprises, based on the total weight of the polymeric composition:

from about 15 to about 88 parts by weight of a polymerization syrup containing an acrylic monomer;

from about 12 to about 90 parts by weight of a particulate filler having an average particle size of less than about 100 microns;

from about 0.001 to about 0.01 parts by weight of crosslinking agent capable of crosslinking the acrylic monomer present in the polymerization syrup;

from about 0.001 to about 0.1 parts by weight of polymerization catalyst;

from about 0.001 to about 0.1 parts by weight quaternary compound;

and from about 0.01 to about 0.02 parts by weight of a polymerization initiator compatible with the acrylic monomer present in the polymerization syrup and capable of crosslinking the mercaptan an acrylate moieties present in the polymerization syrup.

The polymerization syrup employed in the formulation of the acrylic-based particulate filled polymeric compositions of the present invention, and which which has an improved shelf life and can be stored at ambient temperature and pressure without deterioration, consists essentially of:

from about 300 to about 1000 part by volume of an acrylic monomer represented by the formula

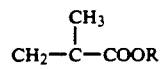

wherein R is an alkyl moiety containing from about 1 to 18 carbon atoms;

from about 0.01 to about 1 parts by volume of a peroxide-free oxygen donator;

from about 0.5 to about 5 parts by volume of a mercaptan; and from about 0.3 to about 40 parts by volume of a crosslinking agent compatible with the acrylic monomer.

As previously stated, the polymerization syrup employed in the formulation of the particulate filled polymeric compositions of the present invention has an improved shelf life. However, the shelf life of the polymerization syrup can be further enhanced by the addition of from about 1 to about 100 parts by volume of a polycarbonate resin, such as allyl diglycol carbonate.

An object of the present invention is to provide a novel particulate filled polymeric composition curable at atmospheric pressure and at ambient temperature.

Another object of the invention, while achieving the beforestated object, is to provide an acrylic-based particulate filled polymeric composition having excellent heat and solvent resistance properties without sacrificing the desired property of acrylic polymeric compositions as to weatherability.

Yet another object of the present invention, while achieving the before stated objects, is to provide an improved acrylic-base particulate filled polymeric composition having the appearance of natural granite which is economical to manufacture, durable and resistant to chipping.

Other objects, advantages and features of the present invention will become apparent upon reading of the following detailed description in conjunction with the appended claims.

DESCRIPTION

The present invention provides an acrylic-based particulate filled polymeric composition which is curable at atmospheric pressure and at ambient temperature and having a pour to pull time of less than about four hours. The particulate filled polymeric composition, which upon curing provides an article or substrate having an appearance similar to that of polished granite, comprises, based on the total weight of the polymeric composition:

(A) from about 15 to about 88 parts by weight of a polymerization syrup containing an acrylic monomer;

(B) from about 12 to about 90 parts by weight of a particulate filler;

(C) from about 0.001 to about 0.01 parts by weight of a crosslinking agent capable of crosslinking the acrylic monomer present in the polymerization syrup;

(D) from about 0.001 to about 0.1 parts by weight of a polymerization catalyst;

(E) from about 0.001 to about 0.1 parts by weight of a quaternary compound; and (F) from about 0.01 to about 0.02 parts by weight of polymerization initiator compatible with the acrylic monomer and capable of crosslinking the mercaptan and acrylate moieties present in the polymerization syrup.

The polymerization syrup employed in the formulation of the polymeric compositions of the present invention consists essentially of (1) from about 300 to about 1000 parts by volume of an acrylic monomer represented by the formula

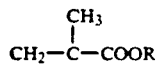

wherein R is an alkyl moiety containing from 1 to about 18 carbon atoms;

(2) from about 0.01 to about 1 part by volume of a peroxide-free oxygen donator, such as 2,2-bis(allyloxymethyl)-butan-1-ol;

(3) from about 0.5 to about 5 parts by volume of a mercaptan; and (4) from about 0.3 to about 40 parts by volume of a crosslinking agent compatible with the acrylic monomer.

In formulating the polymerization syrup employed in the acrylic-based particulate filled polymeric compositions of the present invention, the amount of acrylic monomer employed will vary but will generally be an amount sufficient to provide from about 300 to about 1000 parts by volume of the acrylic monomer in the polymerization syrup. Any suitable acrylic monomer represented by the formula

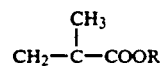

wherein R is an alkyl moiety containing 1 to about 18 carbon atoms, more desirable from 1 to 8 carbon atoms, can be employed in the formulation of the polymerization syrup provided that the acrylic monomer is a liquid at ambient temperature. Examples of alkyl moieties satisfying the definition of R for the before-described formula include methyl, ethyl, propyl, butyl, pentyl, hexyl, heptyl, octyl, nonyl, decyl, undecyl, dodecyl, tetradecyl, pentadecyl, hexadecyl, heptadecyl, octadecyl and the like. Specific examples of acrylic monomers satisfying the above defined formula include methyl methacrylate, ethyl methacrylate, n-butyl methacrylate, 2-ethylhexyl methacrylate, cyclohexyl methacrylate, ω-hydroxyalkyl methacrylate, and the like.

The polymerization syrup, in addition to the acrylic monomer, contains from about 0.1 to about 1 part by volume, based on the total volume of the syrup, of a peroxide-free oxygen donator. Any peroxide-free oxygen donator compatible with the acrylic monomer, the mercaptan and the crosslinking agent constituents of the polymerization syrup can be employed. However, desirable results have been obtained where the peroxide-free oxygen donator is 2,2-bis(allyloxymethyl)-butan-1-ol.

The amount of mercaptan employed in the formulation of the polymerization syrup can vary but will generally be an amount effective to provide the polymerization syrup with from 0.5 to about 5 parts by volume of the mercaptan. Any mercaptan represented by the general formula

RSH wherein R contains from 1 to about 22 carbon atoms can be employed as the mercaptan constituent of the polymerization syrup; and R can be any suitable moiety, such as an alkyl moiety, a cycloaliphatic moiety and the like. Illustrative of such mercaptans are methyl mercaptan, propyl mercaptan, dilimonene dimercaptan, cyclohexyl dimercaptan, ethylcyclohexyl dimercaptan and mixed primary tridecyl mercaptan.

It should be noted that the only requirements for the mercaptan represented by the general formula RSH where R is a moiety as heretofore defined is that the mercaptan be in liquid form under the conditions of mixing, and that the mercaptan be compatible with the acrylic monomer employed in the formulation of the polymerization syrup, as well as with the peroxide-free oxygen donator, i.e. 2,2-bis(allyloxymethyl)-butan-1-ol, and the crosslinking agent.

The amount of crosslinking agent employed in formulating the polymerization syrup to be blended with the particulate filler, the polymerization catalyst, the quaternary compound, and the polymerization initiator to form an acrylic-base particulate filled polymeric composition which can be cured at ambient temperature and atmospheric pressure, without the requirement of a post-curing step, can vary widely and will depend on the efficiency of the crosslinking agent when mixed with a polymerization catalyst. That is, for a strong crosslinking agent, such as ethylene glycol dimethacrylate, the amount of the crosslinking agent employed will be less than when a weaker crosslinking agent is employed. However, it has been found that when formulating a polymerization syrup for use in the polymeric compositions of the present invention the amount of crosslinking agent will generally range from about 0.3 to about 40 parts by volume of the crosslinking agent, based on the total volume of the polymerization syrup.

Typical crosslinking agents which may be employed in the formulation of the polymerization syrup, in addition to ethylene glycol dimethacrylate, include allyl methacrylate, allyl acrylate, ethylene glycol diacrylate, polyethylene glycol dimethacrylate, diethylene glycol dimethacrylate, and triethylene glycol dimethacrylate.

To stabilize the polymerization syrup, and thus enhance the shelf life of the syrup, the polymerization syrup may further include an effective amount of a polycarbonate resin. The amount of polycarbonate resin incorporated into the polymerization syrup can vary widely but will generally be in an amount to provide from about 1 to about 100 parts by volume of the polycarbonate resin in the syrup.

Any suitable polycarbonate resin which is compatible with the acrylic monomer can be employed in the formulation of the polymerization syrup. However, desirable results have been obtained wherein the polycarbonate resin is allyl diglycol carbonate.

It should be noted that in formulating the polymerization syrup as set forth above, one does not need to incorporate polymerization inhibitors into the polymerization syrup in order to prevent undesired or premature polymerization. That is, it has been unexpectedly found that the shelf life of the polymerization syrup can be improved to a desirable level, without the need of refrigeration; and that the shelf life of the polymerization syrup can be further enhanced by incorporation of from about 1 part to about 100 parts by volume of a polycarbonate resin into the syrup, and more desirable from about 25 to about 50 parts by volume of the polycarbonate resin.

To enhance mold release of articles molded employing the polymerization syrup (as either the polymeric composition or as a constituent of an acrylic-base particulate filled polymeric composition), it may be desirable to incorporate into the polymerization syrup an effective minor amount of an internal mold release agent. The amount of the internal mold release agent can vary widely, but will generally be an amount sufficient to provide the syrup with from about 0.01 to about 2 parts per volume of the internal mold release agent.

Any suitable internal mold release agent can be employed in the formulation of the polymerization syrup provided that the mold release agent is compatible with the acrylic monomer, the non-peroxide oxygen donator, the mercaptan and the crosslinking agent employed in formulating the polymerization syrup. For example, desirable results have been obtained wherein the internal mold release agent is a surfactant, and the surfactant is an anionic or nonionic surfactant which does not reduce the transparency of the resulting polymeric resin. Examples of the suitable anionic surfactant include:

sodium alkyl sulfates, such as sodium octylsulfate, sodium laurylsulfate, sodium stearylsulfate;

sodium alkylbenzenesulfates, such as sodium dodecylbenzenesulfate;

sodium alkylsulfonates, such as sodium cetylsulfonate and sodium stearylsulfonate;

sodium dialkyl sulfosuccinates, such as sodium dioctyl sulfosuccinate, and the like. Examples of nonionic surfactans include:

polyethyleneglycol alkyl ethers, such as polyethyleneglycol oleyl ether, polyethyleneglycol lauryl ether, and the like;

polyethyleneglycol alkylphenyl ethers, such as polyethyleneglycol nonylphenyl ether;

higher fatty acid esters of polyethyleneglycol, such as oleic acid ester of polyethyleneglycol, stearic acid ester of polyethyleneglycol, lauric acid ester of polyethyleneglycol, and the like;

polyethyleneglycol polypropyleneglycol ether;

sorbitan fatty acid esters, such as sorbitan monolaurate, sorbitan monostearate, and the like;

polyethyleneglycol sorbitan fatty acid esters, such as polyethyleneglycol sorbitan monolauric acid ester, polyethyleneglycol sorbitan monooleic acid ester, phosphoric acid esters of polyethyleneglycol; and phosphoric acid ester of alkypolyethyleneglycol and the like.

The surfactants listed above are merely illustrative of anionic and nonionic surfactants which can be employed as an internal mold release agent in the formulation of the polymerization syrup employed in the acrylic-base particulate filled polymeric compositions of the present invention. However, desirable results have been obtained wherein the surfactant is sodium dioctyl sulfosuccinate.

A polymerization syrup formulated as set forth above, whether same incorporates the pllycarbonate resin and/or the mold release agent, can be employed in the formulation of the acrylic-based particulate filled polymeric compositions of the present invention which have a granite-like appearance. The acrylic-based particulate filled polymeric compositions of the present invention comprise, based on the total weight of the polymeric composition:

from about 15 to about 88 parts by weight of the polymerization syrup;

from about 12 to about 90 parts by weight of a particulate filler;

from about 0.001 to about 0.01 parts by weight of a crosslinking agent;

from about 0.001 to about 0.1 parts by weight of a polymerization catalyst;

from about 0.001 to about 0.1 parts by weight of a quaternary compound; and from about 0.01 to about 0.02 parts by weight of a polymerization initiator compatible with the acrylic monomer employed in the formulation of the polymerization syrup and capable of crosslinking the mercaptan and acrylate moieties present in the polymerization syrup.

In formulating the acrylic-based particulate filled polymeric compositions of the present invention the amount of the particulate filler employed can vary widely depending on the density desired for the cured articles and the intended use for articles fabricated from the acrylic-based particulate filled polymeric composition. Generally, however, the amount of the particulate filler employed is an amount sufficient to provide from about 12 to about 90 parts by weight of the particulate filler in the polymeric composition.

The particle size of the particulate filler can vary widely and will generally depend upon the ability of the polymerization syrup to wet the particulate filler and the pourability of the acrylic-based particulate filled polymeric composition. Any suitable particulate filler can be used as the filler constituent in the formulation of the polymeric compositions of the present invention as long as the filler is compatible with the polymerization syrup and has an average particle size of less than about 100 microns. Desirably, the particulate filler will have an average particle size of from about 20 to about 40 microns. Example of suitable materials which can be employed as the particulate filler in the polymeric compositions of the present invention are alumina trihydrate ($Al_2O_3 \cdot 3H_2O$), carbon black, graphite, iron oxides, mixtures thereof and the like.

The acrylic-based particulate filled polymeric compositions of the present invention comprise, in addition to the crosslinking agent employed in the formulation of the polymerization syrup, an additional crosslinking agent. The amount of the additional crosslinking agent employed can vary widely and will generally depend on the efficiency of the crosslinking agent. That is, when a strong crosslinking agent, such as ethylene glycol dimethacrylate, is employed the amount required will be less than the amount used for a less efficiency crosslinking agent. However, desirable results can generally be obtained where the amount of the crosslinking agent is present in the polymeric composition in an amount of from about 0.001 to about 0.01 parts by weight, based on the total weight of the acrylic-based particulate filled polymeric composition.

Examples of crosslinking agents which can be employed as the crosslinking agent in the formulation of the acrylic-base particulate filled polymeric compositions of the present invention are polyunsaturated or other polyfunctional crosslinking agents such as ethylene glycol diacrylate, ethylene glycol dimethacrylate, propylene glycol diacrylate, propylene glycol dimethacrylate, trimethylol propane trimethacrylate, pentaerythritol trimethacrylate, glycidyl methacrylate, divinyl benzene, triallyl cyanurate, N-(hydroxymethyl)acrylamide, diallyl phthalate, allyl acrylate, allyl methacrylate, divinyl toluene, triallyl citrate, mixtures thereof and the like. While any suitable poly-unsaturated or other polyfunctional crosslinking agents can be employed which is capable of crosslinking the acrylic monomer present in the polymerization syrup, especially desirable results have been obtained wherein the crosslinking agent is ethylene glycol dimethacrylate.

As previously set forth, the acrylic-based particulate filled polymeric composition of the present invention which is curable at atmospheric pressure and ambient temperature and has a pour to pull time of less than about 4 hours comprises, based on the total weight of the polymeric composition (in addition to the before defined polymerization syrup, the particulate filler, and the crosslinking agent):

from about 0.001 to about 0.1 parts by weight of a polymerization catalyst;

from about 0.001 to about 0.1 parts by weight of a quaternary compound; and from about 0.01 to about 0.02 parts by weight of a polymerization initiator compatible with the acrylic monomer and capable of crosslinking the mercaptan and the acrylate moieties present in the polymerization syrup.

Any suitable polymerization catalyst capable of polymerizing the mixture can be employed in the practice of the present invention. Generally, the polymerization catalyst will be a conventional free-radical initiator, such as a peroxy compound or an azo compound Examples of conventional free-radical initiators which can be employed as the polymerization catalyst in the formulation of the acrylic-based particulate filled polymeric compositions of the present invention are hydrogen peroxide, lauroyl peroxide, benzoyl peroxide, t-butyl perbenzoate, t-butyl peroxypivalate, t-butyl peroxymaleic acid, $\alpha,\alpha'$-azo-bisisobutyronitrile, 2,2'-azo-bio-[$\alpha,\beta$-dimethylvaleronitrile], azodicyclohaxane carbonitrile and the like. While any suitable polymerization catalysts capable of polymerizing the mixture can be employed, especially desirable results have been obtained where the polymerization catalyst is a hemiperester of maleic acid, such as a solution containing 25 percent t-butyl maleic acid and phlegmatizers.

The quaternary compound employed in the formulation of the acrylic-based particulate filled polymeric compositions of the present invention is desirably a quaternary ammonium salt generally known in the industry as a "fabric softener". The quaternary ammonium salt constituent assist in the curing of the polymer composition, as well as enhancing its color clarity properties. Illustrative examples of quaternary ammonium salts which can be employed in the formulation of the polymeric composition of the present invention are as follows:

Dialkydimethylammonium chlorides, such as dicocodimethylammonium chloride and ditallowdimethylammonium chloride;

Dialkyldimethylammonium methylsulfates;

Alkyltrimethylammonium chorides, such as soya trimethylammonium chloride, hydrogenated tallow trimethylammonium chloride, palmityltrimethylammonium chlooride, cocotrimethylammonium chloride, tallow trimethylammonium chloride, and benzyltrimethyammonium chloride; and Alkyldimethylbenzylammoniua chlorides, such as dimethylalkyl($C_{14}$-$C_{18}$)benzylammonium chloride and dimethylalkyl($C_{12}$-$C_{16}$)benzylammonium chloride.

It should be noted that the above examples of quaternary compounds are merely illustrative of the quaternary ammonium salts which can he used in the formulation of the acrylic-based particulate filled polymeric composition having an improved pour to pull time of less than about 4 hours and which can be cured at ambient temperature and atmospheric pressure. Further, of such quaternary ammonium salts it is believed that the most desirable of such salts for use in the formulation of the acrylic-based particulate filled polymeric compositions of the present invention are dicoco-dimethylammonium chloride, benzyltrimethylammonium chloride, trimethyldodecylammonium chloride dimethylalkyl($C_{12-16}$)-benzylammonium chloride and dimethylstearylbenzlammonium chloride.

The polymerization initiator employed in the formulation of the acrylic-based particulate filled polymeric compositions of the present invention can be any suitable peroxy or azo compound which functions as a free-radical initiator, which is compatible with the polymerization syrup, and which enhances the curing properties of the composition without adversely affecting its color clarity. Examples of azo compounds which can be employed in the practice of the present invention are 2,2'-azobis(isobutyronitrile), 2,2'-azobis-(methylbutyronitrile), 1,1'-azobis(cyanocyclphexane) and mixtures thereof and the like.

Examples of peroxy compounds which can be employed as the polymerization initiators in the formulation of the polymeric compositions of the present invention are the hemiperester of maleic acid, such as t-butyl peroxy maleic acid, lauroyl peroxide, benzoyl peroxide, t-butyl perbenzoate and the like. However, especially desirable results have been obtained wherein the polymerization initiator is an azo compound selected from the group consisting of those set forth above, namely, 2,2'-azobis(isobutyronitrile), 2,2'-azobis(methylbutyronitrile), 1,1'-azobis(cyanocyclohexane) and mixtures thereof.

As previously stated, the acrylic-based particulate filled polymeric compositions formulated employing the constituents set forth above can be cured at atmospheric pressure and ambient temperature, and has a reduced pull time of generally less than about 4 hours. However, when employing the azo compounds as the polymerization initiator in the formulation of the acrylic-based particulate filled polymeric compositions of the present invention, the pour to pull time can be further reduced by incorporating into the formulation from about 2 to about 5 parts by weight trimethylpropane triacrylate, a reaction modifier which substantially enhances the curing of the acrylic-based particulate filled polymeric composition and thereby reduces the pour to pull time. That is, by incorporating from about 2 to about 5 parts by weight of the trimethylpropane triacrylate into the formulation where the azo compounds are employed as the polymerization initiator, the pour to pull time of the acrylic-based particulate filled polymeric composition can be substantially reduced to less than about 1 hour, even when the articles being poured or molded have a thickness of up to about 4 inches.

Articles produced using the acrylic-based particulate filled polymeric compositions of the present invention, once cured, are substantially uniform, that is, homogeneous in composition and no air bubbles or voids are detected in the cured composition, even though the composition does not require one to subject the acrylic-based particulate filled polymeric composition to vibration or vacuum during the curing process. Thus, the acrylic-based particulate filled polymeric composition of the present invention provides an economical, reliable method for molding articles having a substantially uniform or homogeneous metrics, which are substantially air bubble and void free, and which have an appearance similar to that of polished natural granite.

If desired, other additives can be incorporated into the acrylic-based particulate filled compositions of the present invention without adversely effecting their curing properties or curing rate. Example of such other additives are ultra-violet light stabilizers, flow agents, pigments and the like. These materials can be added in amounts customarily employed and known in the coating and casting arts.

Preparation of the Polymerization Syrup

In the preparation of the polymerization syrup an acrylic monomer is selected. While any suitable acrylic monomer satisfying the definition of the acrylic monomer set forth hereinbefore can be employed, especially desirable results have been obtained wherein the acrylic monomer is methyl methacrylate.

The acrylic monomer, such as methyl methacrylate, is transferred to a mixing vessel and effective minor amounts of a peroxide-free oxygen donator, such as 2,2-bis(allyloxymethyl)-butan-1-ol, a mercaptan and a crosslinking agent compatible with the acrylic monomer are admixed with the acrylic monomer to form an intimate blend containing from about 300 to 1000 parts by volume of the acrylic monomer, from about 0.01 to about 1 parts by volume of the peroxide-free oxygen donator, i.e., 2,2-bis(allyloxymethyl)-butan-1-ol, from about 0.5 to about 5 parts by volume of the mercaptan, and from about 0.3 to about 40 parts by volume of the crosslinking agent.

When the intimate blend of the four constituents has been achieved, the blend is heated to a temperature of from about 80° C. to about 110° C. for a period of time effective to provide the blend with a desired viscosity. That is, the intimate blend is heated at the specified temperature for a period of time so that the viscosity of the syrup can be controlled depending upon the end use for which the polymerization syrup is to be employed.

When the syrup has achieved the desired viscosity, heat is removed and the blend allowed to cool prior to storage. It should be noted that the polymerization syrup has an improved shelf life, without the need of refrigeration or other cooling of the syrup to prevent polymerization or deterioration of the syrup when same is stored.

While the polymerization syrup prepared in accordance with the procedure above has exhibited improved shelf life, that is, the syrup has demonstrated a storability of at least six weeks at ambient temperature without any detectable changes as to its viscosity or deterioration, the shelf life of the polymerization syrup can be further enhanced by incorporating into the intimate blend, prior to heating, from about 1 to about 100 parts by volume of a polycarbonate resin compatible with the acrylic monomer, such as allyl diglycol carbonate.

To enhance the removal of articles from a mold (when such articles are fabricated of a acrylic-based particulate filled polymeric composition containing the polymerization syrup as heretofore described), an effective minor amount of the internal mold release agent can be incorporated into the intimate blend of the polymerization syrup. The effective minor amount of the internal mold release agent employed can vary widely but will generally be from about 0.01 to about 2 parts by volume of the internal mold release agent per total volume of the syrup. Further, the internal release agent can be any suitable surfactant which is compatible with the acrylic monomer employed in the formulation of the polymerization syrup.

In addition to the internal mold release agent, other additives which do not interfere with the quality or characteristics of the polymerization syrup can be incorporated into the syrup. Typical of such other additives are coloring agents, ultraviolet absorbers or any other appropriate additive which may be desired dependent on the end use of the polymerization syrup.

As mentioned above, the polymerization syrup of the present invention has a remarkably improved shelf life, and the syrup does not need to be stored in refrigerated conditions to maintain the integrity of the syrup.

Preparation of the Acrylic-based Particulate Filled Polymeric Composition

In the preparation of the acrylic-based particulate filled polymeric composition of the present invention, an appropriate amount of the polymerization syrup prepared in accordance with the procedure set forth hereinbefore is transferred to a mixing vessel to which is added the desired amount of the particulate filler and minor effective amounts of the crosslinking agent, polymerization catalyst, quaternary compound and polymerization initiator. The ingredients are then admixed to form an intimate blend containing from about 15 to about 85 parts by weight of the polymerization syrup, from about 12 to about 90 parts by weight of the particulate filler, from about 0.001 to about 0.01 parts by weight of the crosslinking agent, from about 0.001 to about 0.1 parts by weight of the polymerization catalyst, from about 0.001 to about 0.1 parts by weight of the quaternary compound, and from about 0.01 to about 0.02 parts by weight of the polymerization initiator. When the intimate blend of each of the before described ingredients has been formulated, the resulting acrylic-based particulate filled polymeric composition can be cast or molded at atmospheric pressure and ambient temperature to provide an article or product having an appearance of polished natural granite. The pour to pull time of the article molded or cast from the polymeric composition will be less than about 4 hours, even when such article has a thickness up to about 4 inches.

As previously stated, the pour to pull time of articles molded or cast from the polymeric composition of the present invention can be substantially reduce when the polymerization initiator is an azo compound and from about 2 to about 5 parts by weight of a reaction modifier, such as trimethylpropane triacrylate, is incorporated into the intimate blend.

In order to further illustrate the present invention the following examples are given. However, it is to be understood that the examples are for illustrative purposes only and are not to be construed as limiting the scope of the subject invention.

EXAMPLE I

A polymerization syrup was prepared by admixing the following ingredients:
500 ml of methyl methacrylate monomer
90 ml of 2,2-bis(allyloxymethyl)-butan-1-ol
1.5 ml of n-octyl mercaptan
7.5 ml ethylene glycol dimethacrylate
The ingredients were stirred under suitable conditions to insure that a homogeneous blend was obtained.

The intimate blend produced above was then heated in a water bath maintained at approximately 100 degrees Centigrade for a period of from 2 to 4 hours. The heating period was varied so as to provide the polymerization syrup with a predetermined viscosity. When the desired viscosity had been achieved (such viscosity depending solely upon the end use for the arcylic-base particulate filled polymeric composition to be formulated from the polymerization syrup) the polymerization syrup was allowed to cool, placed in a glass container, and the container was sealed.

The sealed glass container was stored at ambient temperature and atmospheric pressure to determine the shelf life of the polymerization syrup. An examination of the syrup was conducted to determine the integrity of the syrup during the storage period. At the end of a three month period a slight deterioration of the syrup was detected, thus illustrating that the syrup containing the methyl methacrylate monomer, 2,2-bis(allyloxymethyl)-butan-1-ol, n-octyl mercaptan and ethylene glycol dimethacrylate had a useful shelf life at ambient temperature and atmospheric pressure of about three months.

EXAMPLE II

A polymerization syrup was formulated in accordance with the procedure of Example I with the exception that 30 ml of a polycarbonate resin (i.e. allyl diglycol carbonate) was incorporated into the blend prior to heating. The polymerization syrup containing the polycarbonate resin was cooled, placed in a glass container, sealed and stored at ambient temperature and atmospheric pressure. Examinations of the syrup were conducted to determine the integrity of the syrup during the storage period. It was observed that after a nine month storage period no deterioration of the syrup could be detected, that is, the viscosity of the syrup was substantially unchanged, and no polymerization of the monomer could be detected. Thus, the experiments substantiated that by incorporating a minor effective amount of a polycarbonate resin into the polymerization syrup a polymerization syrup is provided which has an unexpected, substantially improved shelf life, and that the syrup can be stored at ambient temperature and atmospheric pressure.

EXAMPLE III 1 pound of the polymerization syrup prepared in accordance with Example I was admixed with 1 pound of an alumina trihydrate filler having an average particle size of about $30\pm10$ microns. The polymerization syrup and aluminum trihydrate were admixed to form a substantially homogeneous blend. Thereafter, 10 parts by weight of ethylene glycol dimethacrylate, 10 parts by weight of t-butyl peroxymaleic acid, 1 part by weight benzyl(C-12 alkyl)dimethylisopropanol ammonium chloride and 10 parts by weight of 2,2'-azobis-(methylbutanenitrile) were admixed into the blend of the polymerization syrup and the aluminum trihydrate. Stirring was continued for a short period of time until a uniform blend was obtained which resulted in an acrylic-based particulate filled polymeric composition.

The acrylic-based particulate filled polymeric composition was then poured into molds having a thickness or depth of from 1 to 4 inches. The molds were maintained in a static condition and no vacuum was applied thereto during the curing process. That is, the molds were not vibrated nor was vacuum employed during the curing process in order to remove entrained air from the poured acrylic-based particulate filled polymeric composition. Further, no heat was applied to the poured acrylic-based particulate filled polymeric composition and the composition was allowed to cure at atmospheric pressure and ambient temperature.

The pour to pull time of the acrylic-based particulate filled polymeric composition varied from 1 to 4 hours depending upon the thickness of the mold and thus the thickness of the article molded therein. At the end of the curing period the articles were removed from the molds and examined. The articles produced, once cured, appeared to be uniform (i.e. homogeneous) and no air bubbles were detected in the cured articles.

While the cured articles could be removed from the molds, certain of the articles had a tendency to stick to the surface of the molds.

EXAMPLE IV

An acrylic-based particulate filled polymeric composition was formulated using the procedures of Example III with the exception that about 1.5 parts of volume of on an anionic surfactant (i.e. sodium dioctyl sulfosuccinate) was incorporated into the polymerization syrup prior to the addition of the alumina trihydrate and remaining ingredients. The resulting acrylic-based particulate filled polymeric composition was then poured into the molds in the same manner as the polymeric composition of Example III and the pour to cure time was substantially the same. However, the articles molded from the acrylic-based particulate filled polymeric composition which contained the mold released agent were easily removed from the molds with substantially no adherence of the articles to the surfaces of the molds.

EXAMPLE V

A polymeric composition was formulated utilizing the procedure of Example III with the exception that about 3 parts by weight of trimethylpropane triacrylate was incorporated into the polymeric composition to function as a reaction modifier prior to pouring of the polymeric composition into the molds. The same molding conditions were carried out as in Example III, and the pour to pull time of the articles was reduced to less than 1 hour. However, even though the cured articles could be removed from the molds, certain of the articles had a tendency to adhere to the surface of the molds, thus, requiring more effort to remove the same.

EXAMPLE VI

An acrylic-based particulate filled polymeric composition was formulated utilizing the procedures of Example IV except that about 3.5 parts by weight of trimethylpropane triacrylate was incorporated into the acrylic-based particulate filled polymeric composition prior to pouring to function as a reaction modifier. The same molding conditions were carried out as in Example IV, except that the pour to pull time of the molded articles was reduced to less than about 1 hour; and the articles were easily removed from the molds with substantially no adherence of the articles to the surface of the molds.

The articles molded employing the acrylic-based particulate filled polymeric compositions and procedures set forth above have a surface appearance similar to that of polished natural granite. The articles also exhibited improved resistance to solvents and heat, and the molded articles were extremely durable and have an improved impact strength when compared to articles fabricated using conventional acrylic-based polymeric compositions. Further, the acrylic-based particulate filled polymeric compositions of the present invention exhibit improved curing properties in that such compositions can be cured, even in thicknesses up to about 4 inches, in less than 4 hours at atmospheric pressure and ambient temperature. That is, in order to cure the acrylic-based particulate filled polymeric compositions of the present invention one does not have to employ post curing procedures wherein the cast composition is subjected to elevated temperatures and/or vacuum to effect curing Lastly, articles fabricated employing the acrylic-based particulate filled polymeric composition of the present invention appear to be substantially uniform or homogeneous in matrix structure.

It is clear that the present invention is well adapted to carry out the objects and attain the ends and advantages mentioned therein While presently preferred embodiments of the invention have been described for purposes of this disclosure, numerous changes may be made which will readily suggest themselves to those skilled in the art and which are encompassed within the spirit of the invention disclosed and as defined in the appended claims.

What is claimed is:

1. A particulate containing polymeric composition curable at atmospheric pressure and at ambient temperature and having a pour to pull time of less than about 4 hours, the particulate containing polymeric composition comprising, based on the total weight of the polymeric composition:

from about 15 to about 88 parts by weight of a polymerization syrup consisting essentially of:
from about 300 to about 1000 parts by volume of an acrylic monomer represented by the formula

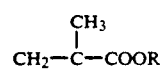

wherein R is an alkyl moiety containing 1 to about 18 carbon atoms;
from about 0.01 to about 1 part by volume of 2,2-bis(allyloxymethyl)-butan-1-ol;
from about 0.5 to about 5 parts by volume of a mercaptan; and
from about 0.3 to about 40 parts by volume of a crosslinking agent compatible with the acrylic monomer;
from about 12 to about 90 parts by weight of a particulate filler;
from about 0.001 to about 0.01 parts by weight of a crosslinking agent;
from about 0.001 to about 0.1 parts by weight of a polymerization catalyst;
from about 0.001 to about 0.1 parts by weight of a quaternary compound; and
from about 0.01 to about 0.02 parts by weight of a polymerization initiator compatible with acrylic monomer and capable of crosslinking the mercaptan and the acrylate moieties present in the polymerization syrup.

2. The particulate containing polymeric composition of claim 1 wherein the polymerization syrup further includes from about 1 to about 100 parts by volume of a polycarbonate resin compatible with the acrylic monomer.

3. The particulate containing polymeric composition of claim 2 wherein the polycarbonate resin is allyl diglycol carbonate.

4. The particulate containing polymeric composition of claim 1 wherein the polymerization initiator is an azo compound selected from the group consisting of 2,2'-azobis(isobutyronitrile), 2,2'-azobis-(methylbutyrontrile), 1,1'-azobis (cyanocyclohexane), and mixtures thereof, and wherein the polymeric composition further comprises from about 2 to about 5 parts by weight trimethylpropane triacrylate.

5. The particulate containing polymeric composition of claim 1 wherein the mercaptan is represented by the formula

RSH wherein R is an alkyl moiety of from 1 to about 22 carbon atoms.

6. The particulate containing polymeric composition of claim 5 wherein the quaternary compound is a quaternary ammonium salt.

7. The particulate containing polymeric composition of claim 6 wherein the quaternary ammonium salt is selected from the group consisting of dicocodimethylammonium chloride, benzyltrimethylammonium chloride, trimethyldodecylammonium chloride, dimethylalkyl-($C_{12}$-$C_{16}$) benzylammonium chloride and dimethylstearylbenzylammonium chloride.

8. The particulate containing polymeric composition of claim 7 wherein the particulate filler has an average particle size of less than 100 microns.

9. The particulate containing polymeric composition of claim 7 wherein the particulate filler is selected from the group consisting of alumina trihydrate, carbon black, graphite, iron oxides and mixtures thereof.

10. The particulate containing polymeric composition of claim 9 wherein the acrylic monomer employed in the formulation of the polymerization syrup is methyl methacrylate.

11. The particulate containing polymeric composition of claim 10 wherein the mercaptan is n-octyl mercaptan and the crosslinking agent employed in the preparation of the polymerization syrup is ethylene glycol dimethacrylate.

12. The particulate containing polymeric composition of claim 11 wherein the polymerization syrup further includes from about 1 to about 100 parts by volume allyl diglycol carbonate.

13. The particulate containing polymeric composition of claim 12 wherein the polymerization initiator is an azo compound selected from the group consisting of 2,2'-azobis(isobutyronitrile), 2,2'-azobis-(methylbutyronitrile), 1,1'-azobis(cyanocyclohexane) and mixtures thereof, and wherein the polymeric composition further comprises from about 2 to about 5 parts by weight trimethylpropane triacrylate.

14. The particulate containing polymeric composition of the claim 1 wherein the polymerization syrup further includes a minor effective amount of an internal mold agent compatible with the acrylic monomer.

15. The particulate containing polymeric composition of claim 14 wherein the polymerization syrup further includes from about 1 to about 100 parts by volume of a polycarbonate resin compatible with the acrylic monomer.

16. The particulate containing polymeric composition of claim 15 wherein the polycarbonate resin is allyl diglycol carbonate.

17. The particulate containing polymeric composition of claim 1 wherein the particulate filler has an average particle size of less than about 100 microns.

18. The particulate containing polymeric composition of claim 17 wherein the polymerization initiator is t-butyl peroxymaleic acid.

19. The particulate containing polymeric composition of claim 18 wherein the quaternary ammonium compound is benzyl(C-12 alkyl)dimethylisopropanol ammonium chloride.

20. The particulate containing polymeric composition of claim 17 wherein the particulate filler has an average particle size of from about 20 to about 40 microns, and the particulate filler is selected from the group consisting of alumina trihydrate, carbon black, graphite, iron oxides and mixtures thereof.

* * * * *

UNITED STATES PATENT AND TRADEMARK OFFICE
CERTIFICATE OF CORRECTION

PATENT NO. : 5,073,587

DATED : December 17, 1991

INVENTOR(S) : Bill R. Edwards

It is certified that error appears in the above-indentified patent and that said Letters Patent is hereby corrected as shown below:

On the title page, item [56] References Cited, under U.S. PATENT DOCUMENTS, delete "Reference U.S. 4,945,122" from the references cited.

Column 2, line 40, delete "an" and substitute therefor --and--.

Column 6, line 37, delete "pllycarbonate" and substitute therefor --polycarbonate--.

Column 8, line 7, delete "compound Exam-" and substitute therefor --compound. Exam-.

Column 8, line 48, delete "he" and substitute therefor --be--.

UNITED STATES PATENT AND TRADEMARK OFFICE
CERTIFICATE OF CORRECTION

PATENT NO. : 5,073,587

DATED : December 17, 1991

INVENTOR(S) : Bill R. Edwards

It is certified that error appears in the above-identified patent and that said Letters Patent is hereby corrected as shown below:

Column 11, line 33, delete "reduce" and substitute therefor --reduced--.

Cover page, [57] Abstract, line 12, delete "miner" and substitute --minor-- therefor.

Column 8, line 40, delete "chlooride," and substitute --chloride,--.

Column 8, line 42, delete "thyammonium" and substitute --thylammonium--.

Column 8, line 60, delete "benzlammonium" and substitute --benzylammonium--.
line 4 of the application as filed.

Column 9, line 20, delete "has" and substitute --have--.

UNITED STATES PATENT AND TRADEMARK OFFICE
CERTIFICATE OF CORRECTION

PATENT NO. : 5,073,587

DATED : December 17, 1991

INVENTOR(S) : Bill R. Edwards

It is certified that error appears in the above-identified patent and that said Letters Patent is hereby corrected as shown below:

Column 11, line 59, delete "acrylic-base" and substitute --acrylic-based--.

Signed and Sealed this

Twenty-second Day of February, 1994

Attest:

BRUCE LEHMAN

Attesting Officer

Commissioner of Patents and Trademarks